Inventors.
John Reece
Franklin A. Reece
by Rogers, Kennedy + Campbell,
Attys.

Patented June 18, 1929.

1,718,074

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

ONE-WAY DEVICE.

Application filed December 19, 1925. Serial No. 76,545.

This invention relates to power transmission, for example for motor vehicles, and involves more particularly a mechanism by which the direction of drive may be reversed, as a part of which is utilized a novel double acting one-way device in the nature of a pawl and ratchet.

The general object of the invention is to afford a means of reversing a drive which will be effective and yet simple and compact. A particular purpose is to render more simple, compact and convenient the power transmission apparatus illustrated in a prior application filed by us December 4, 1925, Serial Number 73,164, and for convenience the present improvement is shown as applied to a transmission similar to that of the prior application. In the class of transmission of the prior application one or more centrifugal masses are employed each movably mounted so that it can travel inwardly and outwardly in respect to the general axis, upon a revolving support which is turned by the power of the engine, each mass being caused to move inwardly and outwardly by connections from the driven shaft, and being attached to such connections, so that when the shafts are turning at different speeds the mass, in one phase will be drawn inwardly against its centrifugal force and thereafter in its second phase allowed to move outwardly, while a pawl and ratchet or other one-way device prevents the transmission of the centrifugal force in a wrong direction to the driven shaft; thus producing intermittent impulses, which may be converted into a constant resilient thrusting torque upon the ultimate driven shaft through a propeller spring, as illustrated in said prior application. In said application are shown two independent one-way devices acting in opposite directions and arranged so that either one or both may be put into effect, so that the driven shaft will turn forwardly or reversely or not at all according to the adjustment. The present invention is intended to overcome certain necessary complications and increase of bulk involved in the prior mechanism. Other and further objects and advantages of the present invention will be explained in the hereinafter following description or will be apparent to those skilled in the art.

To the attainment of the objects and advantages referred to the present invention consists in the novel power transmission apparatus and the novel features of combination, arrangement, operation, mechanism and detail herein illustrated or described.

Figure 1:
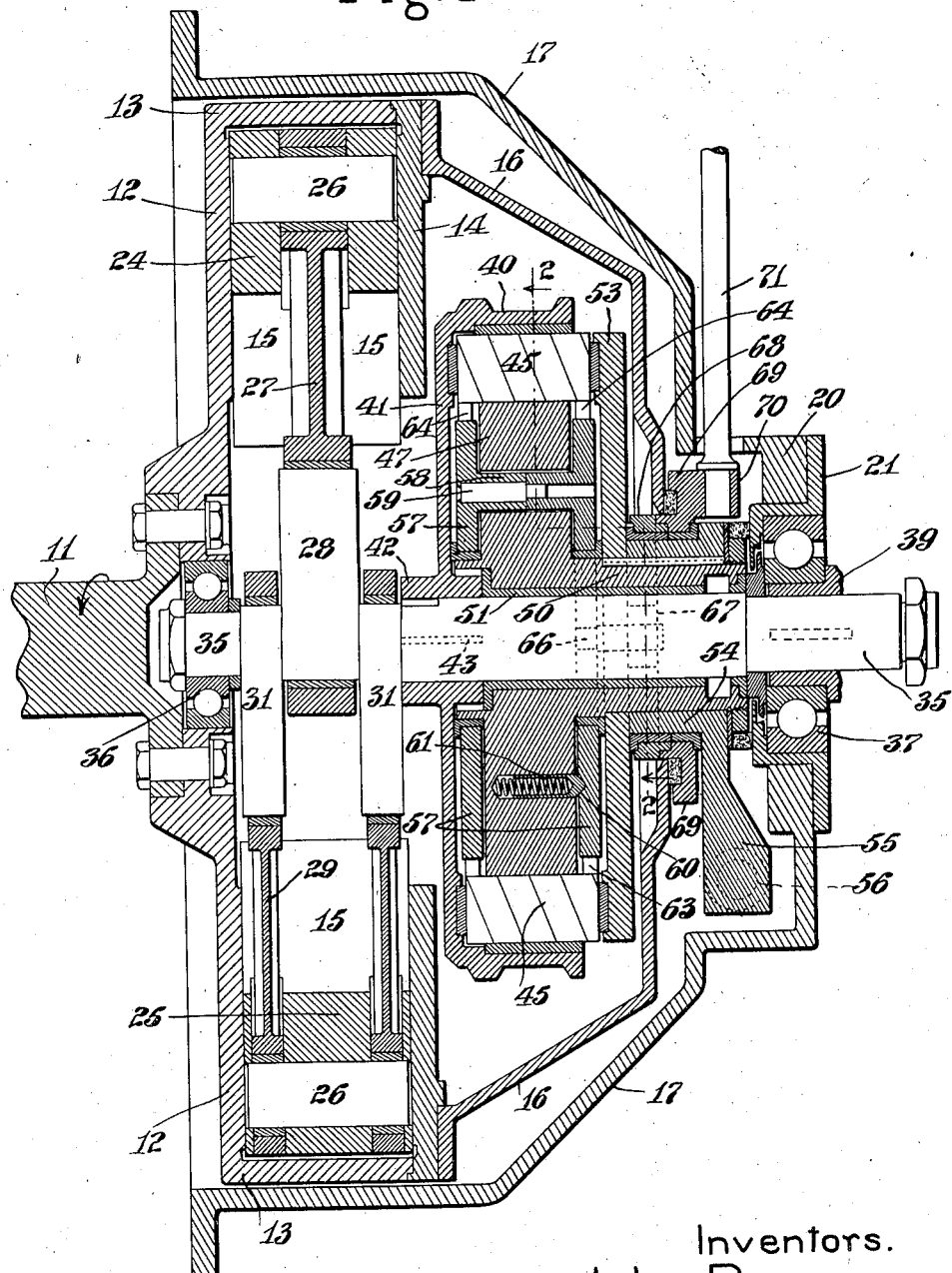

In the accompanying drawings Fig. 1 may be considered a central vertical section, looking from the left, of a transmission apparatus embodying the present invention. The words left, right, front and rear will be used with respect to the application of the apparatus to a motor vehicle.

Figure 2:
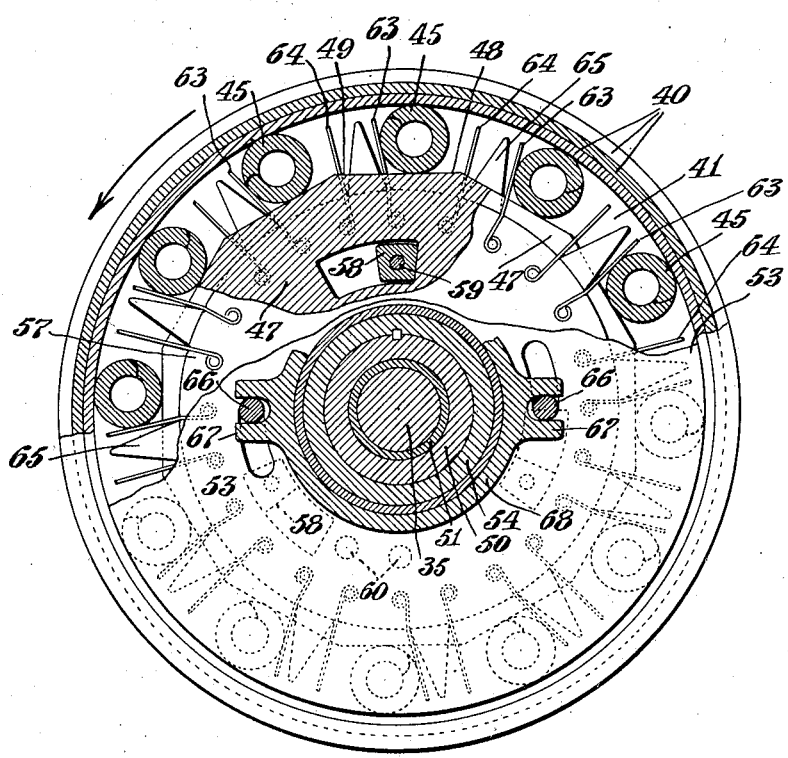

Fig. 2 is a partial rear elevation and a partial transverse section taken on the crooked line 2—2 of Fig. 1.

What may be considered the engine shaft 11 carries a revoluble disk or support 12 formed into a cylindrical shell 13 having a cover disk 14. Between the disks 12 and 14 are fixed guides 15 for the centrifugal masses to be described. To the rear of the cover disk 14 is a hollow shell 16 enclosing certain interior parts. The described elements 11 to 16 may be considered the driving member of the apparatus, these parts turning together and affording the function of a fly wheel, which however is hollow and contains certain further mechanism to be described.

Surrounding the driving parts is shown a fixed casing 17, the rear end of which is formed into a hub 20 within which is fitted a double flanged sleeve member 21. Certain fixed casing parts to the rear may be as shown in said prior application.

The centrifugal masses may be two or more in number there being shown an upper mass 24 and a lower mass 25. The masses carry studs 26 receiving the extremities of eccentric straps 27 and 29 respectively extending from eccentrics 28 and 31 formed on a shaft 35. This shaft may be considered an intermediate driven shaft, as it is preferable to connect the shaft to drive a spring which in turn drives the final driven shaft, as shown in said prior application. The shaft 35 is provided with a ball bearing 36 at its front end and a similar bearing 37 at its rear end. The rear end of the shaft is shown having keyed to it a sleeve member 39 which may be one of the parts of a universal coupling through which the rotation is transmitted, by a longitudinal shaft, as is usual in motor vehicles, to the eventual driven shaft and vehicle wheels at the rear.

The operation of the elements thus far described may be substantially as follows. It will be first assumed that the driven member or shaft 35 is held substantially stationary. The driving parts may be considered as turning counterclockwise in Fig. 2. The eccentrics 28 and 31 being held stationary with the driven shaft, the centrifugal masses 24 and 25 will travel around circles centering on the eccentric axes. This will cause each mass to travel relatively inwardly and outwardly with respect to the general axis or central line of the apparatus. When the masses are in the phase in which they are being moved inwardly the centrifugal force thereof operates to apply a torque for forward rotation of the driven shaft, meaning rotation in the same direction as the engine shaft 11. When the masses pass their inward dead center and move outwardly in their second phase the centrifugal force operates to produce torque in the opposite or reverse direction on the driven shaft. These alternating or pulsating thrusts tend to turn the driven shaft forwardly in one phase and reversely in the succeeding phase. Therefore if the driven shaft is held against reverse rotation while permitting forward rotation it will turn forwardly with intermittent thrusts or impulses. A one-way device in the nature of a pawl and ratchet will accomplish this purpose. A one-way device acting in the opposite direction would allow the driven shaft to turn reversely in alternate phases. The prior application actually shows two one-way devices and means for applying one or the other of them to produce forward or reverse rotation of the driven shaft. In the present invention a single device is used, of such nature that by adjustment it can be made to permit rotation in either direction while preventing it in the other direction.

The new, reversely adjustable, one-way device is illustratively embodied herein as follows. What may be termed a wedging rim or cylinder 40 is shown, surrounding the driven shaft, and formed with a web 41 extending inwardly to a hub 42 secured permanently by key 43 to the driven shaft. The rim part 40 has a lining piece which receives the wedging thrust, while the web 41 has an annular lining for the ends of the wedging rollers, there being a similar opposite lining.

The active or pawl element of the one-way device is herein shown comprising a multiple system of rollers 45. These wedging or friction rollers are preferably slit helically or otherwise as shown to permit a slight compression or flattening so as to give a cushioning effect, minimizing shock and increasing the gripping action.

The complementary wedging member is shown as a polygonal abutment disk 47, each of the wedging rollers being between a surface of the abutment disk and the wedging rim. The abutment disk is preferably held stationary, as will be described, but it is not intended to preclude a slow or small movement thereof, so long as it is relatively stationary and does not render the transmitting actions inoperative.

The same set of wedging rollers 45 and the same abutment disk 47 are herein arranged to take part in the one-way control of driven shaft movement for either forward or reverse drive, although it will be understood that each of the rollers hereof could be replaced by a pair of rollers, one for forward and the other for reverse drive. The polygonal periphery of the abutment disk 47 is shown formed with alternating wedging surfaces 48 cooperating with rollers to secure forward drive and surfaces 49 cooperating for reverse drive. The parts are shown in Fig. 2 in position for forward drive, the rollers 45 wedging between the inclined surfaces 48 and the wedging rim whenever the rim 40 and driven shaft tend to turn reversely or clockwise.

The mountings of the abutment member 47 may be as follows. Its inner part is shown extended rearwardly as a sleeve 50, a lining 51 separating the disk and sleeve from the driven shaft 35. Inside the fly wheel shell 16, and closely adjacent the wedging disk and rollers is a confining disk 53 keyed to the sleeve 50, and therefore stationary. Also keyed to the sleeve 50 is a sleeve or hub 54 which at one side has an outward extension or arm 55 by which it may be anchored against rotation, thus anchoring the abutment disk. The arm 55 may be secured or held substantially stationary by a device 56 which may be a screw.

As will be explained each of the rollers 45 is pressed resiliently into wedging position. For purposes of reversal of action it is herein arranged to reverse the direction of wedging pressure, so that the several rollers will cooperate with the wedging surfaces 49 instead of 48. For this purpose what may be termed reversing rings 57 are shown, one at each side of the abutment disk. The two rings 57 are interconnected through lateral bosses 58 thereon mutually engaged by connecting pins 59. A slight circular movement of the reversing rings 57 relatively to the abutment disk is permitted by reason of an arc shaped aperture in the abutment disk receiving the interconnecting elements 58 and 59. As indicated in Fig. 2 these elements are in triplicate, spaced peripherally around the rings. In order to hold the reversing rings yieldingly in their extreme positions of adjustment the rearmost of the rings 57 is shown formed with a pair of recesses or notches 60, indicated in dotted lines in Fig. 2, arranged to receive a spring pressed pin 61, having a tapered end, as seen in Fig. 1.

The means pressing each of the rollers into a wedging engagement or seat is shown as comprising a number of spring fingers 63 and 64 mounted on the reversing rings 57. Each of the fingers 63 is arranged to press in a clockwise direction on its roller so as to wedge the roller between the abutment surface 48 and the rim 40. The parts are shown in this condition in Fig. 2. Each of the spring fingers 64 is shown idle in Fig. 2, but is arranged to press the rollers counterclockwise to engage the wedging surfaces 49 when reverse drive is desired. This change of adjustment may be effected by a simple shifting of the reversing rings from the position shown in Fig. 2 in a counterclockwise direction, so that each of the rollers is pressed to the surface or seat 49 by its spring 64, and vice versa. A safety expedient, consisting of rigid posts 65, extending between each pair of springs 63 and 64, prevents the accidental carrying of any roller beyond its proper position, and prevents undue straining or bending of the spring fingers.

The adjusting means for effecting such reversal may be as follows. The rear reversing ring 57 is shown as having two pins 66 extending rearwardly through slots in the fixed disk 53. The rear ends of these two pins are engaged by a pair of opposite forks 67 outstanding from a ring 68, which surrounds the hub or sleeve 54 previously mentioned, with preferably a lining between. The ring 68 is arranged in the interior of the fly wheel shell, and to give access to it from the exterior it is shown as interlocking with an exterior ring 69. The latter ring is formed with a lug 70 from which extends radially a reversing lever or handle 71. In Fig. 1 the lever 71 stands away from the observer, the parts being set for forward drive. By moving the lever toward the observer, namely leftward in the vehicle this will throw counterclockwise, in Fig. 2, the ring 68 and thereby shift the reversing rings, so that the one-way device will function to permit clockwise or reverse drive of the driven shaft instead of forward or counterclockwise drive.

The described one-way device permits at will either direction of rotation of the member or shaft 35 and prevents the other direction of rotation. The essential structure involves one or more wedging elements or rollers between a rim member and an abutment member, the latter having opposite wedging surfaces, together with means for adjusting the wedging elements into cooperation with either one of the wedging surfaces and out of cooperation with the other. While the relative arrangement could be reversed preferably the rim member is outside and the abutment member or disk is inside, while the rim member is attached to the shaft and the abutment member anchored. The substantially stationary character of the abutment disk is important in permitting the shifting of the wedging rollers without undue complication. The posts 65 constitute rigid backings for the spring fingers preventing accidental displacement, for if one of the rollers should pass its spring and cross over to the other wedging surface the device would suddenly stop all rotation or cause breakage. The reversing rings taken together constitute a spider, the sole purpose of which is to shift the rollers when the spider is shifted to either one of its two positions.

The herein disclosed power transmission apparatus comprising the driving and driven members, the transmitting means between them and the one-way device is not made the subject of claim herein, but is made the subject of claim in a copending application.

It will thus be seen that there has been described a power transmission apparatus, also a reversible one-way device, embodying the principles and attaining the objects of the present invention. Since many matters of combination, arrangement, operation, mechanism and detail may be variously modified without departing from the principles involved, it is not intended to limit the invention to such matters except so far as set forth in the appended claims.

What is claimed is:

1. A one-way device for permitting at will either direction of rotation of a shaft and preventing the other direction of rotation, comprising an outer rim member connected to the shaft, an inner abutment member having means anchoring it, and wedging elements between said members, the abutment member having first and second series of opposite wedging surfaces, and means for adjusting said wedging elements into cooperation with either series and out of cooperation with the other series of wedging surfaces, comprising a circularly adjustable support having pairs of spring fingers, the fingers of each pair cooperating with two wedging elements, and a rigid backing member between each pair of fingers.

2. A one-way device for permitting at will either direction of rotation of a shaft and preventing the other direction of rotation, comprising a rim member, an abutment member, one of said members connected to the shaft and the other having means anchoring it, and wedging rollers between said members, the abutment member having first and second series of opposite wedging surfaces, and means for adjusting said wedging rollers into cooperation with either series and out of cooperation with the other series of wedging surfaces, comprising a circularly adjustable support having pairs of spring fingers, the fingers of each pair cooperating with two wedging elements, and a rigid backing member between each pair of fingers.

3. A one-way device for permitting at will either direction of rotation of a shaft and preventing the other direction of rotation, comprising concentric outer and inner members, one of them being a rim member connected to the shaft, and the other being an abutment member having means anchoring it, and wedging elements between said members, the abutment member having first and second series of opposite wedging surfaces, and means for adjusting said wedging elements into cooperation with either series and out of cooperation with the other series of wedging surfaces, comprising a circularly adjustable support having pairs of resilient fingers, the fingers of each pair cooperating with two wedging elements and a rigid backing means between each pair of fingers.

In testimony whereof, we have affixed our signatures hereto.

JOHN REECE.
FRANKLIN A. REECE.